Patented June 26, 1945

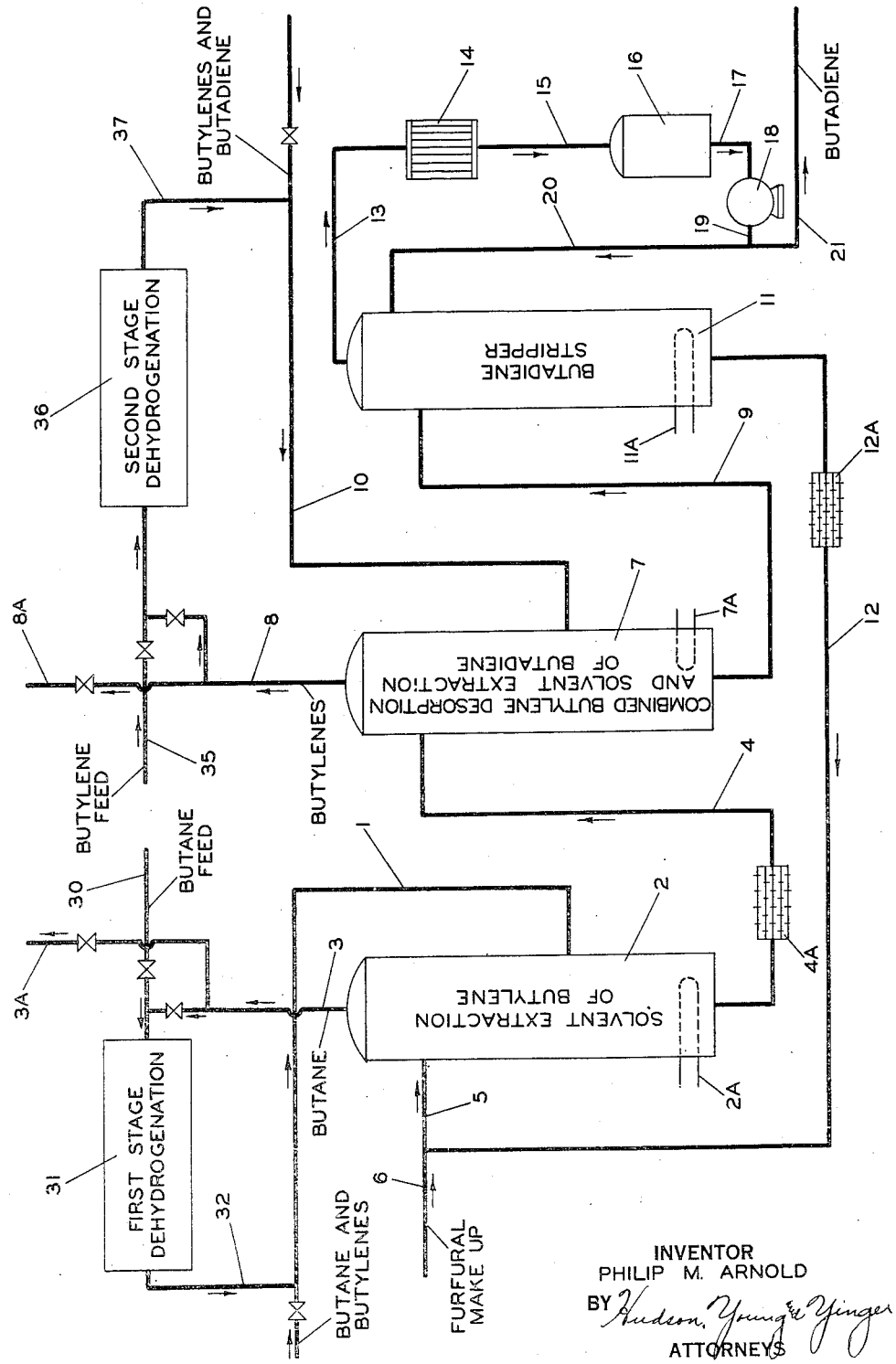

2,379,332

UNITED STATES PATENT OFFICE 2,379,332

SOLVENT EXTRACTION SYSTEM

Philip M. Arnold, Bartlesville, Okla., assignor to Phillips Petroleum Company, a corporation of Delaware Application July 13, 1942, Serial No. 450,725

8 Claims. (Cl. 260—681.5)

This invention relates to a method whereby a monoolefin and a diolefin preferably having the same number of carbon atoms per molecule, can be separated from two streams of hydrocarbons in the vapor state, one of which contains the monoolefin and which preferably consists essentially of paraffins and the monoolefin, and the other of which contains the diolefin and preferably consists essentially of the monoolefin and diolefin.

In accordance with the invention the separation is accomplished by the use of a solvent, such as furfural, which is selective towards both monoolefins and diolefins, but more selective toward diolefins. First the monoolefin-paraffin stream is treated with the selective solvent to extract the monoolefin from the paraffins. The monoolefin-rich solvent from this extraction is used as the selective solvent for the diolefin in the diolefin-monoolefin stream. The diolefin from this latter stream displaces the monoolefin from the selective solvent; thus a vapor phase rich in monoolefin and a liquid extract phase rich in diolefin are obtained. The diolefin is then stripped from the selective solvent. One of the advantages of this arrangement is that only one stripping unit is required. If both streams were extracted with lean solvent, two strippers would be required, one for the extract from each stream.

This system of extraction is particularly adaptable to the recovery of the mono- and di-olefin obtained in the two-stage dehydrogenation of normal butane for the production of butadiene, since the effluents from the two stages consist essentially of a mixture of monoolefin and normal paraffin and of diolefin and monoolefin, respectively, for the first and second stages. However, the invention may be applied to any two streams whatever their source or origin provided one consists essentially of a mixture of paraffin and monoolefin and the other of monoolefin and diolefin.

The invention will be more readily understood by referring to the drawing which is a diagrammatic representation of one embodiment of the invention. The invention will be described as applied to the recovery of butylenes and butadiene from a butane-butylene stream and a butylene-butadiene stream, respectively. However, it is applicable generally to monoolefin-containing and aliphatic conjugated diolefin-containing streams.

A butane-butylene stream is fed to solvent extraction tower 2 via conduit 1 below the level of introduction of the selective solvent into the tower wherein it is intimately contacted with furfural which enters near the top of tower 2 through line 5. Line 5 is supplied with furfural from lines 6 and 12. The furfural selectively dissolves the butylenes, thus separating them from the butanes. The butanes leave tower 2 overhead by means of conduit 3 whence they may be withdrawn from the extraction system via line 3A. The rich furfural leaves tower 2 via line 4 containing cooler 4A and enters the top of tower 7. A feed consisting of a mixture of butylenes and butadiene is introduced into tower 7 via line 10 below the level of introduction of the butylene-rich furfural. The butylene-butadiene stream is intimately contacted with the butylene-rich furfural in tower 7. The furfural being more selective towards butadiene than toward butylenes tends to absorb the butadiene, thus separating it from the butylene in the butylene-butadiene stream. However, at the same time as the butylene-rich furfural selectively absorbs butadiene, the butylenes previously absorbed are displaced giving a butadiene-rich furfural. The butylenes leave tower 7 via line 8 whence they may be removed from the extraction system via line 8A. The butadiene-rich furfural stream leaves tower 7 via line 9 to enter stripping column 11 where the butadiene is stripped from the furfural. The butadiene leaves column 11 overhead via line 13 through cooler 14 and line 15 to enter reflux accumulator 16. The liquefied butadiene is withdrawn from the bottom of accumulator 16 by pump 18 through line 17. The butadiene is discharged from pump 18 through line 19. A portion of the butadiene is returned to column 11 via line 20 as reflux. The remaining portion is withdrawn from the system through line 21. The lean furfural leaves column 11 as a bottom product through line 12, passes through cooler 12A, and is returned to the extraction system through line 5.

Reboil arrangements (reboiling coils 2A, 7A and 11A) are employed in the two extraction steps and in the stripping zone. Furfural is a solvent to varying degrees for practically all hydrocarbons. Those hydrocarbons towards which furfural is least selective are most readily removed by reboiling, while those towards which it is most selective are more difficult to remove by reboiling. In the first step of the extraction process, wherein butylenes are selectively absorbed from butanes, a certain amount of butane will tend to dissolve along with the butylenes. This can be practically completely removed from the furfural by a reboiler arrangement 2A located in the bottom of the absorber 2. It is necessary to operate the reboiler 2A at such a temperature that a part of the butylenes will be displaced. However, these displaced gaseous products in passing upwardly through the furfural in the absorber come in contact with furfural which is colder than that in the bottom of the absorber near the reboiler, and the furfural being more selective towards the butylenes again absorbs them while most of the butanes will be withdrawn overhead. The same process goes on in the second absorption step, wherein the butylene-rich furfural from the first step is used as the selective solvent for butadiene contained in a butadiene-butylene stream. The butadiene tends to displace the butylenes from the butylene-rich furfural, but, nevertheless, without reboiling of the furfural small amounts of butylene will remain dissolved in the furfural and later appear as a contaminant in the butadiene. Consequently, the residual butylenes have to be removed in the same manner as described for the removal of the residual butanes by a reboil arrangement. It is obvious that a reboil arrangement 11A or its equivalent must be employed in the stripping column 11 in order to recover the butadiene.

The invention, in a more specific aspect, may be applied to a process for the two-stage catalytic or thermal, preferably the former, dehydrogenation of normal butane to butadiene. For example, fresh normal butane fed via line 30, together with recycled butane from line 3, may pass into first-stage dehydrogenation zone 31 and the effluent comprising mainly butylene and unreacted butane, either directly as such or after separation in any way of a C4 fraction containing these components, passed via line 32 into line 1. Likewise the butylenes leaving via line 8 may be passed, either alone or in admixture with fresh butylene feed entering via line 35, through the second-stage dehydrogenation zone 36 and the dehydrogenation effluent comprising chiefly butadiene and unreacted butylene, either directly or after separation of a C4 fraction comprising those components, passed via line 37 into the line 10. This arrangement gives an unusually simple, compact, efficient and economical installation.

It will be understood that instead of the preferred selective solvent, furfural, I may use, though by no means absolutely equivalently therewith in every respect, any other solvent having generally the solvent action described, such as: nitrobenzene, dichlorodiethylether, dimethyl formamide, methyl levulinate, glycol diacetate, diethyl acetamide, pyridine, phenol, phenol plus water, benzyl alcohol, etc.

Instead of butadiene, other aliphatic conjugated diolefins such as isoprene, piperylene, certain of the hexadienes, etc. may be recovered by means of the process of my invention, from admixture with aliphatic monoolefins, usually of a corresponding number of carbon atoms. In such case a stream of the corresponding olefins in admixture with the corresponding paraffins may be extracted with the selective solvent and the resulting olefin-rich solvent used to treat the diolefin-monoolefin stream. For example a mixture of pentane and pentenes may first be extracted to selectively dissolve pentenes and the pentene-rich solvent employed to treat a pentadiene-pentene stream in the manner described above.

Many advantages of my invention will be obvious to those skilled in the art. Among them are the fact that essentially pure butenes and butadiene are readily recovered from the corresponding streams containing the same in a simpler, more efficient and more economical manner. Also the apparatus requirements are simplified, and operation is more trouble-free. The process is particularly valuable when combined with the two-stage dehydrogenation of normal butane to butadiene. The displacement of the butenes with butadiene may be nicely regulated so that neither the butene product nor the butadiene product is contaminated with the other. Numerous other advantages will be apparent.

I claim:

1. The method of manufacturing butadiene from normal butane which comprises passing said normal butane through a first dehydrogenation zone to at least partially convert it to butylene, treating a stream containing the unreacted butane and butylene content of the effluent with a selective solvent which is selective for butylene and butadiene but more selective for the latter, to dissolve the butylene content of said stream, recycling the undissolved unreacted butane to said first zone, treating the butylene-rich solvent with a butadiene-butylene mixture derived from a second dehydrogenation zone to cause the butadiene to dissolve in said solvent and displace the butylene therefrom, and passing the butylene derived by said last step to a second dehydrogenation zone to at least partially convert it to butadiene.

2. In a process for preparing butadiene from normal butane wherein said normal butane is dehydrogenated at least partially to butylene in a first stage and wherein said butylene is at least partially dehydrogenated to butadiene in a second stage, the improvement which comprises treating the butylene-butane content of the first-stage effluent with a selective solvent for butylene and butadiene, and desorbing butylene from the butylene-rich solvent by contacting with the butadiene-butylene content of the second-stage effluent whereby the butadiene displaces the dissolved butylene.

3. The process of claim 2 wherein said solvent is furfural.

4. The method of separating a monoolefin from a first hydrocarbon stream containing the same and a close-boiling paraffin hydrocarbon and also separating an essentially monoolefin-free aliphatic conjugated diolefin from a second hydrocarbon stream containing the same and from a different source than said first hydrocarbon stream, which comprises extracting said first stream by intimately contacting same in a first zone with a lean selective solvent which is more selective towards both monoolefins and diolefins than paraffin hydrocarbons and is more selective towards diolefins than the monoolefins and thereby effecting selective dissolution of substantially all of the monoolefin content of said stream while allowing the paraffin hydrocarbon content thereof to pass through said first zone undissolved, withdrawing said undissolved paraffin from said fine zone, extracting said second stream by intimately contacting same in a second zone with the monoolefin-rich solvent resulting from said extracting step and thereby effecting selective dissolution of the diolefin content of said second stream and displacement by said diolefin of substantially all of said dissolved monoolefin from said monoolefin-rich solvent, recovering said displaced monoolefin, and withdrawing same from said second zone and from the system as the monoolefin product of the process, and stripping said dissolved diolefin essentially free from monoolefin from the diolefin-rich solvent resulting from said second extracting step and withdrawing the diolefin so stripped and essentially free from monoolefin from the system as the diolefin product of the process.

5. The method of separating an essentially paraffin-free monoolefin from a first hydrocarbon stream consisting essentially of said monoolefin and the orresponding paraffin and also separating an essentially monoolefin-free aliphatic conjugated diolefin from a second hydrocarbon stream from a different source than said first hydrocarbon stream consisting essentially of said diolefin and the corresponding monoolefin which has the same number of carbon atoms as said monoolefin in said first stream which comprises extracting said first stream by intimately contacting same in a first zone with a lean selective solvent which is more selective towards both monoolefins and diolefins than paraffins and is more selective towards diolefins than monoolefins and thereby effective selective dissolution of substantially all of the monoolefin content of said stream while allowing the paraffin content to pass through undissolved, withdrawing said undissolved paraffin from said first zone, separately extracting said second stream by intimately contacting same in a second zone with the monoolefin-rich solvent resulting from said extracting step and thereby effecting selective dissolution of the diolefin content of said second stream and displacement of substantially all of said dissolved monoolefin from said monoolefin-rich solvent while allowing the monoolefin content of said second stream to pass through undissolved, in admixture with said displaced monoolefin, recovering said undissolved and displaced monoolefin in admixture and withdrawing same from said second zone and from the system as the monoolefin product of the process and stripping said dissolved diolefin essentially free from monoolefin from the diolefin-rich solvent resulting from said second extracting step and withdrawing the diolefin so stripped and essentially free from monoolefin from the system as the diolefin product of the process.

6. The process of claim 5 in which the rich solvent leaving said extracting steps is reboiled immediately prior to its exit therefrom to insure complete removal of paraffin from the monoolefin-rich solvent leaving the first extracting step and complete removal of monoolefin from the diolefin-rich solvent leaving the second extracting step.

7. The process of claim 5 in which said paraffin is butane, said monoolefin is butylene and said diolefin is butadiene.

8. The process of claim 5 in which said paraffin is butane, said monoolefin is butylene, said diolefin is butadiene, and said solvent is furfural.

PHILIP M. ARNOLD.